Figure 1:
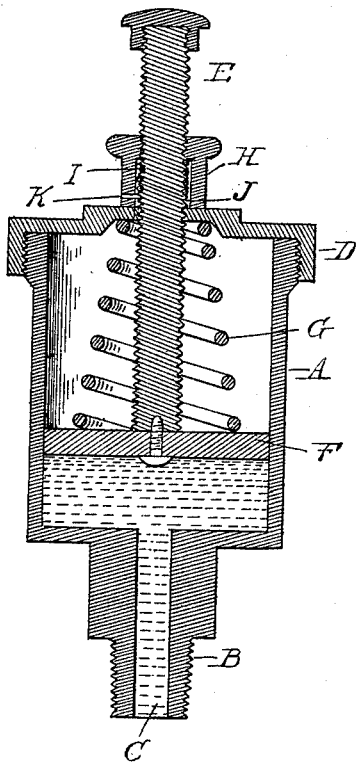

No. 626,489. Patented June 6, 1899.
W. A. DOWNES.
DOPE CUP.
(Application filed Apr. 29, 1898.)
(No Model.)

Witnesses
A. L. Hobby
P. M. Hulbert

Inventor
William A. Downes
By W. W. Sprague & Son
Attys.

United States Patent Office.

WILLIAM A. DOWNES, OF DETROIT, MICHIGAN, ASSIGNOR TO THE PENBERTHY INJECTOR COMPANY, OF SAME PLACE.

DOPE-CUP.

SPECIFICATION forming part of Letters Patent No. 626,489, dated June 6, 1899.

Application filed April 29, 1898. Serial No. 679,257. (No model.)

*To all whom it may concern:*

Be it known that I, WILLIAM A. DOWNES, a citizen of the United States, residing at Detroit, in the county of Wayne and State of Michigan, have invented certain new and useful Improvements in Dope-Cups, of which the following is a specification, reference being had therein to the accompanying drawings.

The invention relates to oil or dope cups; and it consists particularly in the locking means for the stem of the actuating-piston, all as more fully hereinafter described and claimed.

In the drawings I show my invention applied to a dope-cup.

Figure 2:
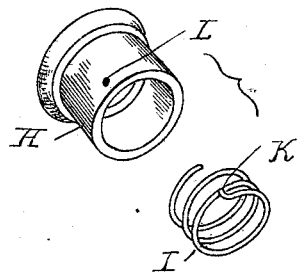

Figure 1 is a vertical central section therethrough. Fig. 2 is a detached perspective view of the lock-nut and its locking-spring.

A represents the casing of a dope-cup, which has an apertured discharge-nipple B, C being the passage therethrough. D is the cap of the cup, which I show screwed thereon. The cap is centrally apertured, and through it passes the screw-threaded stem E, having on its end the piston F.

G is a spring between the cap and piston, and this spring is contracted or allowed to expand by means of an exterior adjusting-nut. It is evident as the nut is turned up the spring can expand and will push down the piston and force out the dope below.

These cups are often placed on moving parts of machines, and when thus placed the nut H often becomes loose and allows feeding down of the piston more than is desired. To form an inexpensive means of preventing this, which at the same time does not prevent the adjustment of the nut, I construct the device as follows: I is a spiral spring, which will fit in the threads of the stem with sufficient friction to prevent its accidental turning, and this spring I connect to the nut, which thus holds the nut. The means of connection and arrangement of these parts is not material; but I prefer to form in the bottom of the nut a recess J, in which the spring is arranged, and form an offset or pin K at the lower end of the spring, which pin is engaged in an aperture L in the nut.

What I claim as my invention is—

1. In an oiling device the combination with a screw-threaded stem, of a spiral spring frictionally engaging the threads thereon, and a nut on the stem to which the spring is secured at one end.

2. In an oiling device the combination with a screw-threaded stem, of a nut thereon, having a recess therein, a spiral spring in the recess frictionally engaging the threads of the stem and having one end secured to the nut.

3. An oil-cup the combination with the oil-cup casing, and its cap, of the stem passing through the cap, a piston on the end of the stem within the cup, a spring between the cap and piston, an adjusting-nut for the spring on the stem outside the cap, said nut having a recess in its lower edge around the stem, a spiral spring in the recess engaging the threads of the stem, and an offset or pin on the lower end of the spring detachably engaging an aperture in the nut.

In testimony whereof I affix my signature in presence of two witnesses.

WILLIAM A. DOWNES.

Witnesses:
  M. B. O'DOGHERTY,
  OTTO F. BARTHEL.